April 25, 1933.  A. C. GILBERT  1,905,462
ELECTRIC DRILL OR SIMILAR TOOL
Filed May 20, 1929
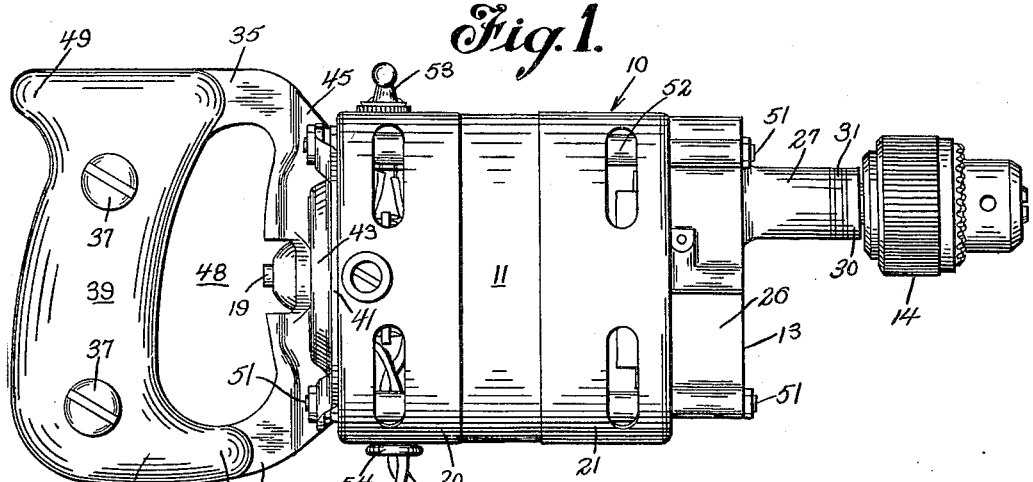
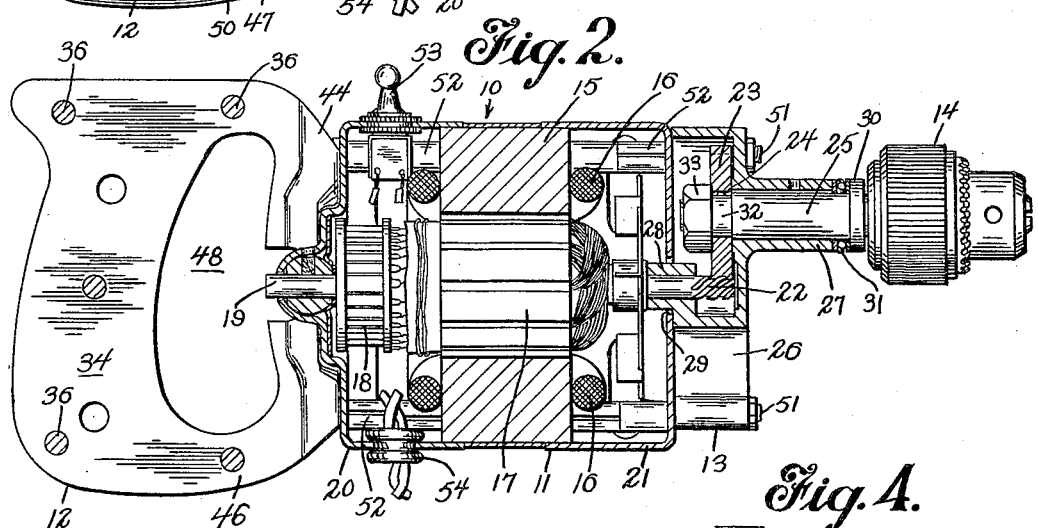
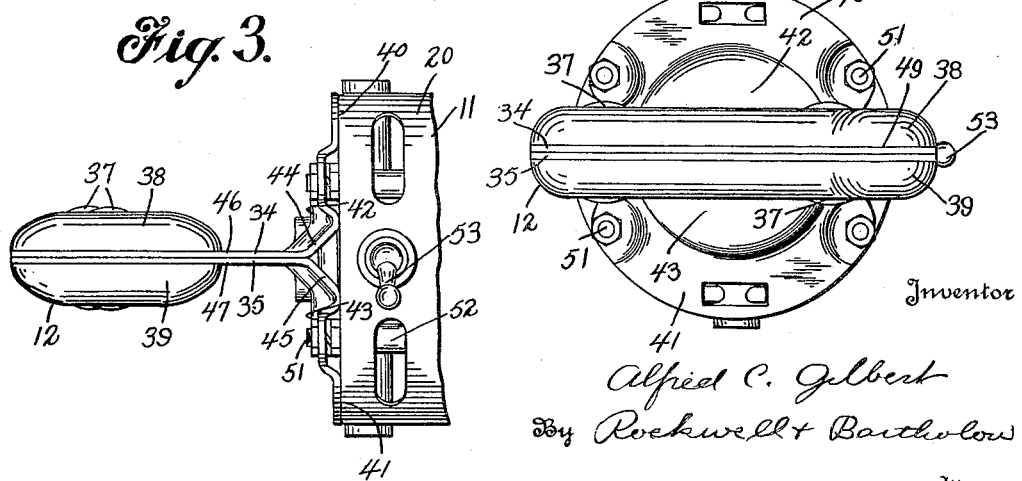

Patented Apr. 25, 1933

1,905,462

UNITED STATES PATENT OFFICE

ALFRED C. GILBERT, OF NORTH HAVEN, CONNECTICUT, ASSIGNOR TO THE A. C. GILBERT COMPANY, OF NEW HAVEN, CONNECTICUT, A CORPORATION OF MARYLAND

ELECTRIC DRILL OR SIMILAR TOOL

Application filed May 20, 1929. Serial No. 364,449.

My invention relates to an electric drill or similar tool and more especially to a portable electric drill or tool which may be used wherever a supply of electric power is available.

The invention relates to a relatively light, portable electric tool which may be supported in the hand of an operator, and which, while efficient in use, is of relatively simple form and may be cheaply manufactured.

In a more specific aspect, the invention relates to a portable electric tool comprising a motor, a speed reduction unit, and motor supporting means, and one of the objects of the invention is to provide a relatively simple form of tool in which these elements are rigidly connected together.

A feature of the invention resides in a novel form of handle by means of which the tool may be rigidly and comfortably supported by the hand of an operator when in use.

A still further feature of the invention resides in a novel switch arrangement, whereby the motor may be started and stopped by the operator by means of the thumb or finger of the hand supporting the tool.

To these and other ends, the invention consists in the novel features and combination of parts to be hereinafter described and claimed.

In the drawing,

Fig. 1 is a general view, showing an electric drill, according to my invention;

Fig. 2 is a view similar to Fig. 1, but in section;

Fig. 3 is a plan view of the handle for supporting the drill; and

Fig. 4 is an end view of the drill, likewise showing the handle.

Referring to the drawing in which I have illustrated my invention by showing a preferred embodiment of the same, the reference numeral 10 indicates, in general, my electrically driven tool which, in the present instance, takes the form of an electric drill comprising, in general, a motor 11, handle 12, speed reduction unit 13, and drill chuck 14.

The motor 11 comprises the usual field magnet 15, field magnet coils 16, armature 17, commutator 18, shaft 19, and end plates 20 and 21. The speed reduction unit 13 may conveniently take the form of a gear 22 on the end of shaft 19, gear 22 meshing with gear 23, keyed at 24 to shaft 25 on which chuck 14, which may be of any suitable or preferred type, is mounted. Speed reduction unit 13 is provided with a casing 26 having a hollow interior in which gears 22 and 23 are mounted, casing 26 being provided with a bearing boss 27 in which shaft 25 is mounted for rotation, and a bearing boss 28 extending through an opening 29 in cover plate 21 and serving to support the adjacent end of shaft 19.

Shaft 25 is flanged at 30 and between the flange 30 and the adjacent end of boss 27 is an anti-friction thrust bearing 31 which may be of any suitable or preferred type, and which transmits the thrust on chuck 14, incident to drilling or other operations, to boss 27. Preferably, the shaft 25 is reduced, as at 32, for the reception of gear 23, the latter being held on the reduced end 32 by means of nut 33 mounted on the threaded end of shaft 25 and bearing tightly against wheel 23. Gear 23 transmits any thrust on shaft 25 in an outward direction to casing 26.

One of the features of the invention resides in an improved form of handle, whereby the tool may be rigidly and comfortably supported while in use. In the preferred embodiment of the invention illustrated, the handle 12 is substantially T-shape in cross-section, and may be conveniently formed out of a pair of heavy sheet metal L-shaped members 34 and 35 rigidly secured together, as for example, by being spot welded at 36, and by means of bolts 37, which pass through handle grips 38 and 39 and through members 34 and 35. Members 34 and 35 are provided with arcuate portions 40 and 41 which abut against the adjacent face of end plate 20 and are dished out at 42 and 43 for stiffening purposes, as well as to conform to the shape of end plate 20. Members 34 and 35 are further stiffened by inclined walls 44 and 45 which join the dished parts 42 and 43 to arms 46 and 47 on which the handle grips 38 and 39 are mounted.

Handle 12 is provided with an opening 48 for the admission of the fingers of the operator, and at its upper end is outwardly curved, as at 49, to provide a part which may rest on the hand of the operator between the thumb and forefinger, the lower ends of the grips 38 and 39 being continued forwardly, as at 50, to provide a broad, smooth surface on which the small finger may rest.

As will be seen from Figs. 1 and 2 of the drawing, the handle has a notch communicating with the finger aperture 48 at the front middle part of the latter, and the rear bearing for the motor shaft is located in this notch.

The handle 12, the parts of motor 11, and reduction unit 13, may be rigidly secured together in a simple manner by a plurality of bolts 51 which pass through the handle 12, end plates 20 and 21, field magnet 15, and casing 26 of reduction unit 13, end plates 20 and 21 being held in spaced relation with regard to the magnet 15 by means of spacers 52 in the form of sleeves received on bolts 51. The bolts and spacers serve to transmit thrusts in chuck 14 directly to handle 12 and thereby relieve motor 11 from undue strains.

Adjacent handle 12 on an upper part of motor 11 is a motor controlling switch 53 which may be conveniently reached by the thumb or forefinger of the operator, while on the lower part of the motor is an insulated opening 54, through which a cord may pass which leads to any suitable source of electrical energy.

From the above description of the nature of my invention and the preferred embodiment for carrying out the same, it will be seen that I have provided a relatively simple form of portable electric tool in which the several parts are rigidly connected together, and which may be comfortably and efficiently supported by the hand of an operator, while in use, the position of the electric switch being such that the operation of the tool may be readily controlled by the hand supporting the same.

While I have shown and described a preferred embodiment of my invention, it will be understood that it is not to be limited to all the details shown but is capable of modification and variation within the spirit of the invention and the scope of the appended claims.

What I claim is:

1. In an electric tool, an electric motor, a handle for supporting the motor and a speed reduction unit, said handle comprising a pair of L-shaped members secured together with two of their arms abutting and the other arms extending laterally on either side of the abutting arms and common means for securing the laterally extending arms and the speed reduction unit to the motor casing.

2. In an electric tool, an electric motor, a handle for supporting the motor and a speed reduction unit, said handle comprising a pair of L-shaped members secured together with two of their arms abutting and the other arms extending laterally on either side of the abutting arms, and common means for securing the laterally extending arms and the speed reduction unit to the motor casing, said last named means comprising bolts extending through the handle, casing, and speed reduction unit.

3. In an electric tool, including an electric motor having a field magnet and end plates at either end thereof, the field magnet and plates being clamped together by a number of bolts passing therethrough, the combination of a handle mounted on the motor, said handle being substantially T-shape and having an axially directed part provided with an aperture for the insertion of the fingers of an operator, said axially directed part terminating at one end in relatively wide laterally directed arms extending outwardly at right angles to said part on the opposite sides thereof, said arms being carried under the bolts and being secured to the motor casing by means thereof, said handle having a notch communicating with said finger aperture at the front middle part of the latter, and said motor having a shaft bearing located in said notch.

In witness whereof, I have hereunto set my hand this 17th day of May, 1929.

ALFRED C. GILBERT.